United States Patent Office 3,567,825
Patented Mar. 2, 1971

3,567,825
ANTIMICROBIAL PREPARATIONS
Herbert Klesper, Cologne-Flittard, Fritz Steinfatt, Opladen, Klaus Langheinrich, Leverkusen, and Walter Lorenz, Wuppertal-Vohwinkel, Germany, assignors to Farbenfabriken Bayer Aktiengesellschaft, Leverkusen, Germany
No Drawing. Filed Nov. 15, 1965, Ser. No. 507,672
Claims priority, application Germany, Nov. 20, 1964, F 44,483
Int. Cl. A01n 9/26
U.S. Cl. 424—230                    4 Claims

ABSTRACT OF THE DISCLOSURE

Antimicrobial preparations based on reaction products of an amide and paraformaldehyde.

---

The present invention relates to antimicrobial preparations; more particularly it concerns antimicrobial preparations based on amides.

It is known that amides of the general formula $$R-SO_2-NH-R'$$

in which R stands for an alkyl or aryl radical, and R' for an alkyl, aryl or aralkyl radical, these radicals being preferably substituted by halogen and/or trifluoromethyl; or amides of the general formula

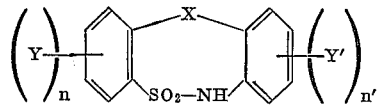

in which X denotes a direct bond or an oxygen atom, Y and Y', independently of one another, stand for hydrogen, halogen and/or trifluoromethyl, and $n$ and $n'$ denote integers of 1 to 3; or amides of the general formula

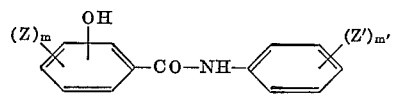

in which Z stands for hydrogen, halogen, alkyl or trifluoromethyl, Z' denotes hydrogen, halogen or trifluoromethyl, and $m$ and $m'$ are integers of 1 to 3, have a disinfectant activity. Such compounds can be used successfully, for example, as disinfectants in dry-cleaning.

It has now been found that improved results are attained in dry cleaning by using preparations obtained by heating an amide of the above formulae with paraformaldehyde at 90–150° C. in organic solvents. Those preparations are preferred, which are produced from an amide of the above formulae and paraformaldehyde in the ratio of 1 mol amide to 0.3 to 3 mol formaldehyde, optionally in the presence of alkali hydroxide and with the use of water-miscible organic solvents.

Examples of suitable organic solvents are the mono-ethers obtained from ethylene glycol, propylene glycol or butylene glycol and lower monohydric alcohols, such as ethyl alcohol and propyl alcohol.

The necessary amounts of preparations according to the invention can easily be determined by preliminary experiments; an addition of 4 g. of the preparations per litre cleaning liquor will generally be sufficient.

The following examples serve to illustrate the invention without, however, limiting its scope; the parts given are parts by weight.

EXAMPLE 1

Fabrics of wool, cotton, polyacrylonitrile fibres or synthetic polyamide fibres, which are infected with Stc. aureus, Bct. coli, Bct. proteus, Bct. pyocyaneum and Stc. glycerinaceus, are subjected for 20 minutes to a conventional dry cleaning in perchloroethylene or heavy benzene containing, per litre, 5 g. of a commercial cleaning intensifier based on anion-active and non-ionic tensides and 4 g. of one of the antimicrobial preparations described below under (a) to (g). The relative atmospheric humidity in the vapour chamber of the cleaning unit is 75%. The fabrics are subsequently centrifuged and dried. The fabrics then prove to be free from germs.

The antimicrobial preparations concerned are produced in the following manner:

(a) 200 parts chloromethane-sulpho-3,4,6-trichloroanilide are dissolved in 734 parts ethylene glycol monopropyl ether with the addition of 37 parts 45% sodium hydroxide solution while warming, 29 parts paraformaldehyde are then added, and the mixture is heated at 90° C. for 20 minutes.

(b) 300 parts 2,4,5,3'-tetrachloro-benzene-sulphanilide are dissolved in 623 parts ethylene glycol monopropyl ether with the addition of 61 parts 45% sodium hydroxide solution while warming, 16 parts paraformaldehyde are subsequently added, and the mixture is heated at 120° C. for 20 minutes.

(c) 200 parts 2,4,5,2',4',5',-hexachloro-benzene-sulphanilide are dissolved in 740 parts ethylene glycol monopropyl ether with the addition of 27 parts 45% sodium hydroxide solution while warming, 23 parts paraformaldehyde are subsequently added, and the mixture is heated at 120° C. for 20 minutes.

(d) 200 parts, 2,4,5.4'-tetrachloro-2'-trifluoromethyl-benzene-sulphanilide are dissolved in 740 parts ethylene glycol monopropyl ether with the addition of 27 parts 45% sodium hydroxide solution while warming, 23 parts paraformaldehyde are subsequently added, and the mixture is heated at 120° C. for 20 minutes.

(e) 200 parts 7,9,10-trichloro-6-dibenzo-(c,e)-o-thiazine-5-dioxide are heated in 742 parts ethylene glycol monopropyl ether with the addition of 33 parts 45% sodium hydroxide solution while warming, 25 parts paraformaldehyde are subsequently added, and the mixture is heated at 120° C. for 20 minutes.

(f) 200 parts salicyclic acid-2,3-dichloroanilide are dissolved in 743 parts ethylene glycol monopropyl ether with the addition of 45 parts 45% sodium hydroxide solution while warming, 34 parts paraformaldehyde are subsequently added, and the mixture is heated at 120° C. for 20 minutes.

(g) 130 parts 2,4,5,3'-tetrachlorobenzene-sulphanilide and 70 parts salicyclic acid-2,3-dichloroanilide are dissolved in 724 parts ethylene glycol monopropyl ether with the addition of 43 parts 45% sodium hydroxide solution while warming, 33 parts paraformaldehyde are subsequently added, and the mixture is heated at 120° C. for 20 minutes.

When the dry cleaning is not carried out with one of the preparations according to the invention, but instead with an addition of the amides on which the preparations are based, in an amount of 4 g. per litre cleaning liquor, the fabrics are not free from germs after cleaning.

We claim:

1. An antimicrobial preparation wherein the active component comprises the product obtained by heating (a) at least one amide of the formula

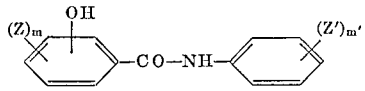

wherein Z is hydrogen, halo, alkyl or trifluoromethyl; Z' is hydrogen, halo or trifluoromethyl and $m$ and $m'$ are integers of from 1 to 3 with (b) paraformaldehyde at about 90–150° C. in an organic solvent at a molar ratio of 1 mol amide to 0.3 to 3 mol formaldehyde.

2. The antimicrobial preparation of claim 1 wherein said organic solvent is a water-miscible organic solvent.

3. The antimicrobial preparation of claim 1 wherein said solvent is a monoether obtained from ethylene glycol, propylene glycol or butylene glycol and a lower monohydric alcohol.

4. The antimicrobial preparation of claim 1 wherein said amide is of the formula

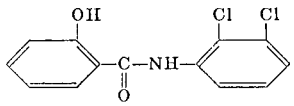

References Cited

Merck Index, 7th ed., (1960), pp. 772–773.
Chem. Abst (I), 43, 6363h (1949).
Chem. Abst. (I), 60, 16248e (1964).

STANLEY J. FRIEDMAN, Primary Examiner

U.S. Cl. X.R.

252—106